United States Patent
Moldestad et al.

(10) Patent No.: US 7,292,546 B2
(45) Date of Patent: Nov. 6, 2007

(54) BANDWIDTH REDUCTION WITHIN PACKET SWITCHED NETWORKS BY NOT SENDING IDLE TIMESLOTS

(75) Inventors: Terje Moldestad, Arendal (NO); Per Eirik Heimdal, Grimstad (NO); Halvard Widerøe Njølstad, Søgne (NO); Berner Vegge, Lyngdal (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/595,003

(22) PCT Filed: Jun. 5, 2003

(86) PCT No.: PCT/NO03/00183

§ 371 (c)(1),
(2), (4) Date: Dec. 5, 2005

(87) PCT Pub. No.: WO2004/110000

PCT Pub. Date: Dec. 16, 2004

(65) Prior Publication Data

US 2006/0239269 A1    Oct. 26, 2006

(51) Int. Cl.
*H04B 7/212* (2006.01)
(52) U.S. Cl. .................. 370/321; 370/337; 370/347
(58) Field of Classification Search ........... 370/321, 370/324, 376, 395.1, 503, 509, 510, 436, 370/310, 337, 347
See application file for complete search history.

(56) References Cited

U.S. PATENT DOCUMENTS

| | | | |
|---|---|---|---|
| 4,962,497 A * | 10/1990 | Ferenc et al. ............. 370/354 |
| 5,351,232 A * | 9/1994 | Yamashita .................. 370/248 |
| 5,787,346 A * | 7/1998 | Iseyama ..................... 455/439 |
| 5,790,552 A | 8/1998 | Batts et al. |
| 5,889,773 A * | 3/1999 | Stevenson, III ............ 370/352 |
| 6,201,966 B1 * | 3/2001 | Rinne et al. ................ 455/434 |
| 6,633,566 B1 * | 10/2003 | Pierson, Jr. .............. 370/395.1 |
| 2003/0016697 A1 | 1/2003 | Jordan |

FOREIGN PATENT DOCUMENTS

| WO | WO9708838 A | 3/1997 |
|---|---|---|
| WO | WO9851113 A | 11/1998 |
| WO | WO 0147199 A | 6/2001 |

OTHER PUBLICATIONS

European Patent Office, International Search Report for PCT/NO03/00183, dated Dec. 19, 2003.

* cited by examiner

*Primary Examiner*—Sonny Trinh
(74) *Attorney, Agent, or Firm*—Roger S. Burleigh

(57) ABSTRACT

The present invention describes a method in telecommunication networks where time division multiplexing traffic is transported over packet switched networks comprising one or a number of transmitting parties where the transmitting party will not send idle timeslot data on the transporting network. In one preferred embodiment will the transmitting party provide information regarding which timeslot hat are not used. Said telecommunication network can preferably be a packet switched network, wherein the packet switched network is one of the following: an IP-network, MPLS, ATM or Frame Relay.

6 Claims, 2 Drawing Sheets

Example of where the invention is applicable

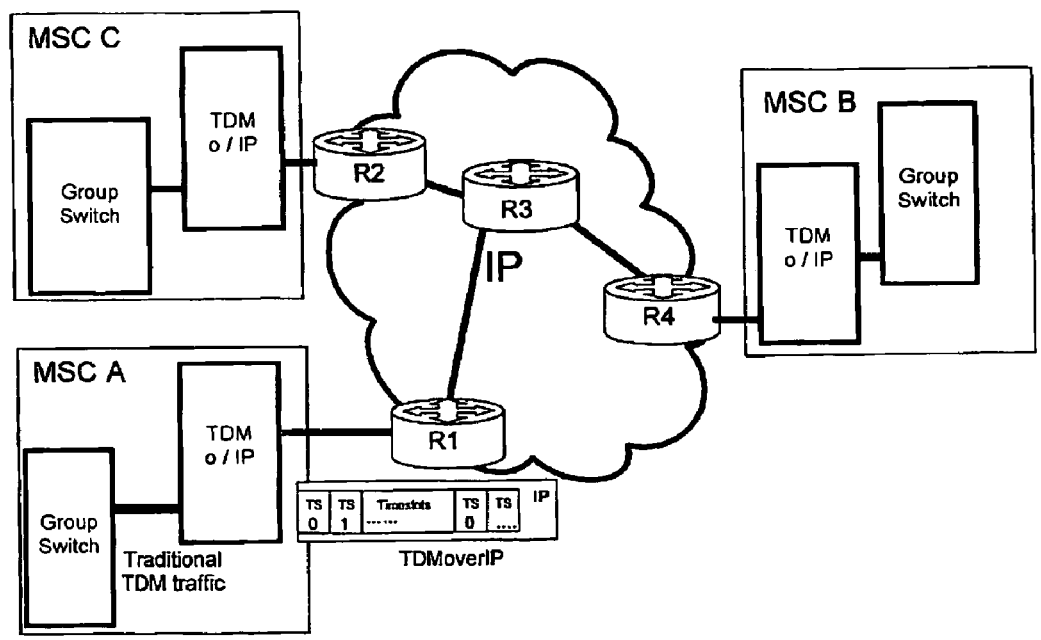
Figure 1: Example of where the invention is applicable

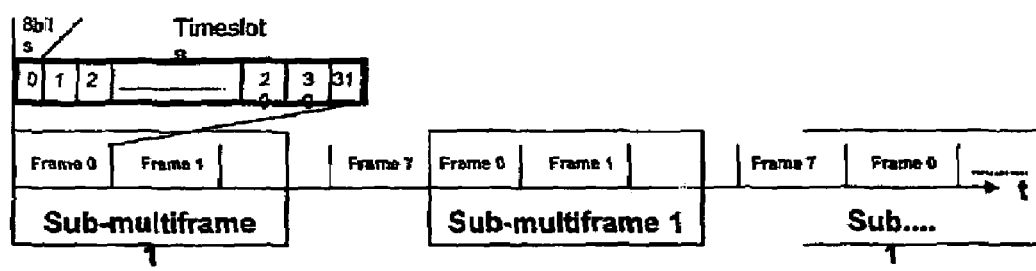
Figure 2: The organization of the transmitted data in ETSI 32ch. Standard

BANDWIDTH REDUCTION WITHIN PACKET SWITCHED NETWORKS BY NOT SENDING IDLE TIMESLOTS

FIELD OF THE INVENTION

The present invention is related to telecommunication networks and in particular to methods where time division multiplexing traffic is transported over packet switched networks comprising one or a number of transmitting parties, and one or a plurality of receiving parties.

BACKGROUND OF THE INVENTION

The invention is applicable where the Time Division Multiplexing technique (TDM) is used on the site and a packet based protocol, i.e. the Internet Protocol (IP), is implemented in the transport network between the sites. Traditionally TDM (Time Division Multiplexing) traffic is today transmitted directly over SDH (Synchronous Digital Hierarchy) networks. However, it is assumed that tomorrow's telecom transport network will be packet based, but probably with a long reuse time of existing site equipment.

Many vendors believe that the future network protocol will be the Internet Protocol (IP). With the introduction of this network technology for real-time applications, telecom companies may get a dilemma. On one hand they want to adapt to the new technology, on the other hand they have a lot of equipment like MSC (Mobile Switching Centre); BSC (Base Station Controller) etc. working very well with circuit switched technology. Buying a complete new packet based solution right away and to phase out circuit switched equipment will be very expensive. Another possibility is to maintain circuit switched and packed switched networks in parallel, but this may also be regarded as too expensive. Facing the fact that the operator on long term probably will implement packet-based transport solutions anyway, i.e. the Internet Protocol (IP), a wanted solution is a mechanism that allows the Telecom Company to use today's equipment such as MSCs, BSCs etc. towards a packet switched network as an intermediate solution. Then in a later step, when the packet based technology is considered mature for real time applications on site, the change to an "all packet switched" scenario could be regarded reasonable. A problem when transporting TDM over packet based networks is the bandwidth utilization in the transport network. With Time Division Multiplexing, the connections are separated in timeslots. Depending on the traffic load situation, there will be a variable numbers of timeslots not carrying any traffic (they are IDLE). Even though there are timeslots not carrying traffic, these timeslots are today filled with a so-called "Idle Pattern", "Idle pattern" is a fixed bit pattern and it is used in synchronous systems where there can not be any "holes" in the data stream, and transmitted through the network.

A draft to the Internet Engineering Task Force (IETF) describing the concept TDM over IP has been posted. (TDM over IP, Yaakov (Jonathan) Stein et al. March 2003) In this draft there is also a suggestion as to what the protocol stack could look like. The mentioned drafts have no option for dynamic IP bandwidth reduction. There are methods for transporting parts of a trunk (24/32 timeslots), but in a more static way. The described method is rather complicated, introducing a lot of extra overhead etc.

This invention describes a solution to avoid the transmission of the timeslots carrying Idle Pattern and hence reducing the average size of IP packets transmitted. The IP bandwidth reduction requires that information is being sent from the transmitting party to the receiving party, about which timeslots are, at a given moment, not carrying traffic. Equipment existing today provides information about whether a timeslot contains traffic or not.

The present invention uses this information to avoid transmitting timeslots not carrying traffic.

The invention introduces a method for reducing the total amount of data transmitted in a system where traditional TDM circuit switched data are transported over a packet switched network. This will bring a better utilization of the network resources.

SUMMARY OF THE INVENTION

It is an object of the present invention to provide a system/device and method that eliminates the drawbacks described above. The features defined in the claims enclosed characterize this method.

BRIEF DESCRIPTION OF THE DRAWINGS

In order to make the invention more readily understandable, the discussion that follows will refer to the accompanying drawings.

FIG. 1 shows an example where the invention is applied.

FIG. 2 shows the organization of the transmitted data in ETSI 32 ch standard.

DETAILED DESCRIPTION OF PREFERRED EMBODIMENTS

The major achievement for the present invention is the reduced need for bandwidth, due to the fact that a transmitting party will not send idle timeslot data on the transportation network, but only signal to the receiving party which timeslots are not used, hence there will be increased bandwidth utilization in the transport network.

In one embodiment of the invention, as depicted in FIG. 1, a scenario with TDMoIP is shown. At MSC A, traditional TDM traffic comes from the Group Switch. Today this traffic goes to an Exchange Terminal (ET) before it is sent out on the SDH network. The invention uses the "TDMoIP" Exchange terminal, which can encapsulate TDM traffic into IP packets. From TDMoIP the data is sent to the packet router R1 communicating with MSC A. Through the IP network, MSC A can communicate with both MSC B and MSC C which are connected through routers R4 and R2 respectively. The invention requires that the TDMoIP units receive signalling information on which timeslots are idle. In FIG. 1, both MSC A and MSC C have to communicate with MSC B through router R3. If the invention is used, it could in this scenario i.e. ease the work for router R3, avoiding queue and dropped packets due to fewer/shorter IP packets. In general the invention is particularly useful for the intermediate routers, and the more hops the more favourable is the invention.

The principle of the packet based, i.e. IP, bandwidth reduction is that the transmitting party will signal which timeslots are not carrying any traffic. These timeslots would, without this invention, carry the "Idle pattern" and hence block this capacity for other users. The idea is to remove the "idle pattern" data from the payload and only signal that this timeslot is not carrying any user traffic. Arriving at the destination in the transport network, the packet-based bearer will be terminated. The incoming data will, upon some signalling bits, find out which timeslots are not transmitted.

The receiving party will then insert the "Idle pattern" into the data stream at the right position. This will happen at the point where i.e. the Internet Protocol (IP) is terminated. The original circuit switched data are then reproduced.

To reproduce the original data stream, the receiving site will insert the "Idle Pattern" data into the stream based on the signalling from the transmitting party. Information about which timeslots are transmitting "Idle Pattern" data is i.e. available as an "Idle Pattern Flag" in the DL34 interface from the Ericsson Group Switch on site. It must be noted that according to the standards, the transmitting party cannot remove timeslots from the data stream based on analyses of the data stream itself because the transmitted data could accidentally be identical to the "Idle Pattern". The unused timeslots should be removed based on information from the signalling in the system (i.e. from Group Switch or ISUP).

The signalling part can be solved in different ways depending on the standard used. The 32-channel ETSI (European Telecommunication Standards Institute) standard, timeslot 0 (TS-0) contains some free bits, marked as Sa in the FIG 3. It is also possible to use other bits in TS-0 as many of them have fixed values not representing any information value (sync), as it is known that the data arrive when the IP packet has arrived. For this standard, TS0 will always have to be present in the data stream.

For the 32-channel solution depicted in FIG. 2, 31 bits are needed to signal which timeslots are idle, it is not necessary to signal for TS-0, as this timeslot is always used. Table 1 shows the standardized content of timeslot 0. There are 20 free bits (Sa-bits) in one sub multi-frame. In order to signal for 31 timeslots, 2 sub multi-frames are needed. This means that Sa4 in Frame 1 in Sub multi-frame 1 will i.e. be used to signal whether timeslot 1 is idle or not. Sa5 in Frame 1 will i.e. be used to signal whether timeslot 2 is idle or not etc. As one cannot signal for all timeslots in every frame, there could be some delay/losses before the far end notices that a given timeslot is idle/not idle anymore. The exact number will be 16 frames, each of 125 microsecond's duration, totally giving 2 milliseconds delay. Each connection (timeslot) will, theoretically in a "zero delay" system, loose 16 bytes of data. This is normally not critical neither for speech nor for data, as the higher network end-to-end signalling protocols are slower than the process turning Idle Pattern on/off. If it is important not to loose any frames with valid data, it can be implemented with a check for frames containing valid data for a certain timeslot, timeslots with valid data can then be marked as "not idle" before the multi-frame is sent. The drawback is that a delay of 1 ms will be added with such a solution.

| Sub Multi Frame | Frame | Bit 1 to 8 in Timeslot 0 | | | | | | | |
|---|---|---|---|---|---|---|---|---|---|
| | | 1 | 2 | 3 | 4 | 5 | 6 | 7 | 8 |
| 1 | 0 | C1 | 0 | 0 | 1 | 1 | 0 | 1 | 1 |
| | 1 | 0 | 1 | A | Sa4 | Sa5 | Sa6 | Sa7 | Sa8 |
| | 2 | C2 | 0 | 0 | 1 | 1 | 0 | 1 | 1 |
| | 3 | 0 | 1 | A | Sa4 | Sa5 | Sa6 | Sa7 | Sa8 |
| | 4 | C3 | 0 | 0 | 1 | 1 | 1 | 1 | 1 |
| | 5 | 0 | 1 | A | Sa4 | Sa5 | Sa6 | Sa7 | Sa8 |
| | 6 | C4 | 0 | 0 | 1 | 1 | 1 | 1 | 1 |
| | 7 | 0 | 1 | A | Sa4 | Sa5 | Sa6 | Sa7 | Sa8 |
| 2 | 0 | C1 | 0 | 0 | 1 | 1 | 0 | 1 | 1 |
| | 1 | 0 | 1 | A | Sa4 | Sa5 | Sa6 | Sa7 | Sa8 |
| | 2 | C2 | 0 | 0 | 1 | 1 | 0 | 1 | 1 |
| | 3 | 0 | 1 | A | Sa4 | Sa5 | Sa6 | Sa7 | Sa8 |

-continued

| Sub Multi Frame | Frame | Bit 1 to 8 in Timeslot 0 | | | | | | | |
|---|---|---|---|---|---|---|---|---|---|
| | | 1 | 2 | 3 | 4 | 5 | 6 | 7 | 8 |
| | 4 | C3 | 0 | 0 | 1 | 1 | 1 | 1 | 1 |
| | 5 | 0 | 1 | A | Sa4 | Sa5 | Sa6 | Sa7 | Sa8 |
| | 6 | C4 | 0 | 0 | 1 | 1 | 1 | 1 | 1 |
| | 7 | 0 | 1 | A | Sa4 | Sa5 | Sa6 | Sa7 | Sa8 |

This opens for another way of signalling which timeslots are IDLE. If this new protocol shall be able to handle the bandwidth reduction solution described in this document, some bits must be reserved for this purpose. In the long term this will probably be the best solution and it will be usable for both 24 channel and 32 channel systems.

The invention can be used for all kinds of traffic based on TDM technology that needs to be transported through a packet-based network. Examples of packet based transport networks are IP, MPLS, ATM, and Frame Relay etc. To be able to use the bandwidth reduction, there must be some indication (i.e. from the Group Switch or other signalling) available as to which timeslots are filled with Idle Pattern.

It is also possible to add an extra field in the protocols used for signalling which timeslots are filled with Idle Pattern. The drawback is that whenever there are no idle timeslots, the packet size will be increased due to the introduction of the extra signalling bits.

This principle could be used for any known fixed bit pattern, not only for the Idle Pattern used in the standard TDM telephone systems.

List of Abbreviations
ATM Asynchronous Transfer Mode
BSC Base Station Controller
ETSI European Telecommunication Standards Institute
IETF Internet Engineering Task Force
IP Internet Protocol
ISUP ISDN User Part
MPLS Multi Protocol Label Switching
MSC Mobile Switching Centre
RFC Request for Comments
SDH Synchronous Digital Hierarchy
TDM Time Division Multiplex
PSN Packet Switched Network

The invention claimed is:

1. A method for transporting time division multiplexed traffic over packet switched networks between transmitting parties, comprising the steps of:
    a) compressing time division multiplexed traffic by removing idle timeslot data from said time division multiplexed traffic; and,
    b) adding signalling data to said time division multiplexed traffic regarding which idle timeslot data has been removed, wherein said signalling data is added to free bits or bits having prefixed values in a timeslot 0 of a time division multiplex frame.

2. The method according to claim 1, further comprising the step of encapsulating compressed time division multiplex frames into data packets and forwarding the data packets over the packet switched network.

3. The method according to claim 1, wherein the packet switched network type is selected from the group consisting of:

Internet Protocol;
Multi Protocol Label Switching;
Asynchronous Transfer Mode; and,
Frame relay.

4. A method for receiving time division multiplexed traffic over packet switched networks, comprising the steps of:
examining received signalling data in time slot 0 of a time division multiplex frame, said signalling date identifying where idle timeslot data has been removed; and,
decompressing said time division multiplexed traffic, wherein the time division multiplexed traffic is encapsulated in data packets, by inserting prefixed idle pattern data into received data packets as a function of said received signalling data.

5. The method according to claim 4, further comprising the step of decapsulating the decompressed packet switched traffic into time division multiplex traffic.

6. The method according to claim 4, wherein the packet switched network type is selected from the group consisting of:

Internet Protocol;
Multi Protocol Label Switching;
Asynchronous Transfer Mode; and,
Frame relay.

* * * * *